Patented Jan. 2, 1940

2,185,660

UNITED STATES PATENT OFFICE 2,185,660

PROCESS AND PRODUCT RELATING TO STABILIZATION OF CYCLIC SULPHIDES

Willem Coltof and Siegfried Leonard Langedijk, Amsterdam, Netherlands, assignors to Shell Development Company, San Francisco, Calif., a corporation of Delaware No Drawing. Application October 18, 1937, Serial No. 169,736. In the Netherlands November 26, 1936

6 Claims. (Cl. 23—250)

The present invention relates to a method for the stabilization of cyclic organic sulphide compounds, and to new and useful stable compositions comprising cyclic organic sulphides.

The cyclic sulphide compounds to which the present invention is applicable are those organic compounds consisting of or containing a ring system composed of three or more, and more particularly three members, at least one member of which is di-valent sulphur. Typical examples of cyclic sulphides which may be stabilized by the method of the present invention are the alkylene sulphides, such as ethylene sulphide $$CH_2\!\!-\!\!-\!\!CH_2$$
$$\diagdown\!\!S\!\!\diagup$$

propylene sulphide $$CH_2\!\!-\!\!-\!\!CH\!\!-\!\!CH_3$$
$$\diagdown\!\!S\!\!\diagup$$

symmetrical dimethyl ethylene sulphide $$CH_3\!\!-\!\!CH\!\!-\!\!-\!\!CH\!\!-\!\!CH_3$$
$$\diagdown\!\!S\!\!\diagup$$

isobutylene sulphide $$CH_2\!\!-\!\!-\!\!\underset{\underset{CH_3}{|}}{C}\!\!-\!\!CH_3$$
$$\diagdown\!\!S\!\!\diagup$$

unsymmetrical methyl ethyl ethylene sulphide $$CH_2\!\!-\!\!-\!\!\underset{\underset{CH_3}{|}}{C}\!\!-\!\!CH_2\!\!-\!\!CH_3$$
$$\diagdown\!\!S\!\!\diagup$$

α amylene sulphide $$CH_2\!\!-\!\!-\!\!CH\!\!-\!\!CH_2\!\!-\!\!CH_2\!\!-\!\!CH_3$$
$$\diagdown\!\!S\!\!\diagup$$

symmetrical methyl ethyl ethylene sulfide $$CH_3\!\!-\!\!CH\!\!-\!\!-\!\!CH\!\!-\!\!CH_2\!\!-\!\!CH_3$$
$$\diagdown\!\!S\!\!\diagup$$

isopropyl ethylene sulphide

trimethyl ethylene sulphide

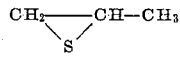

tetramethyl ethylene sulphide $$CH_3\!\!-\!\!\underset{\underset{CH_3}{|}}{C}\!\!-\!\!-\!\!\underset{\underset{CH_3}{|}}{C}\!\!-\!\!CH_3$$
$$\diagdown\!\!S\!\!\diagup$$

trimethylene sulphide $$CH_2\!\!-\!\!CH_2\!\!-\!\!CH_2$$
$$\diagdown\!\!\!\!\!\!\diagup\!\!\!\!\diagup$$
$$S$$

and the homologous saturated aliphatic sulphides. Likewise, the similar unsaturated aliphatic sulphides such as butadiene monosulphide

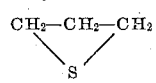

isoprene monosulphide

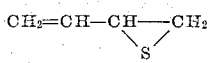

and the like, the corresponding polysulphides such as butadiene disulphide

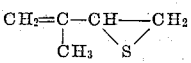

and the like, analogous sulphides of cyclic compounds including both aliphatic and aromatic compounds, such as, for example, cyclohexene sulphide, styrene sulphide and the like may be stabilized according to the method of the present invention. Cyclic sulphides containing other constituents, such as halogen, —NH₂, —OH, —COOH, —CN, —AsH₂, etc., for example, hydroxypropylene sulphide

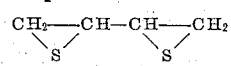

monochlor ethylene sulphide

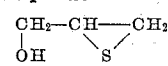

as well as those compounds containing nitrogen, oxygen or a second sulphur atom in the ring are likewise included among the compounds whose stability may be enhanced according to the present method.

Compounds of the above types have the common property of being relatively unstable, the instability being due to a large extent to the strain present in the three and four membered rings and to the unsaturated character of the di-valent sulphur. Since the corresponding di-valent selenium and tellurium compounds likewise possess this strained-unsaturated property, it is believed that they can be stabilized equally as effectively as the corresponding sulphides.

The instability of these compounds is manifested by the ease with which they are affected by a great number of reagents. Thus, they form numerous addition compounds, may interreact in a variety of ways, and form insoluble compounds of unknown composition with a wide variety of reagents. Due to their sensitivity, many of the compounds of the type in question were not successfully synthesized until comparatively recently.

Ethylene sulphide which is one of the more unstable members of the class may be prepared, for example, according to French Patent No. 797,621, or Soc. Chim. de France, 27 (1920) 740. The compounds of the general class to which the invention relates may vary somewhat as to their stability as also to their sensitivity to various agents. In general, the lower members containing a three-membered ring system are the more unstable, while their higher homologues possess slightly better stability. The compounds containing four membered rings are, in general, considerably more stable and in some instances only manifest instability under special circumstances. These compounds may be considered as intermediate between the very unstable three-membered ring compounds and the stable five-membered ring compounds, although in one respect, namely, the addition tendency, they often differ from these in having a considerably less unsaturated character.

While this class of compounds, to which the present invention relates, has not been as thoroughly investigated as other more common classes, due to a large extent to their relative instability, the class as a whole has a great potential value. Recent investigation has shown many of these compounds to possess exceptional toxic properties which makes them eminently suited for insecticidal and related uses. Other members are effective odorants. Many of the potential uses of these compounds are, however, limited or nullified by the instability of the compounds. Since most of the compounds in question begin a gradual deterioration as soon as formed, which deterioration proceeds at different rates according to the conditions, impurities present and the compound in question, it is usually necessary to apply them within a relatively short time if the full value of the compound is to be utilized. This obviously constitutes a distinct disadvantage in many instances. While in some cases, as for instance, ethylene sulphide prepared from ethylene oxide and potassium rhodanide, the deterioration is clearly evidenced by the development of an insoluble material, this is not necessarily always the case. Many of the compounds in question deteriorate quite imperceptibly and while this deterioration may not be harmful for some uses, it constitutes a decided disadvantage in others. For instance, it is found that many of the compounds upon deterioration during storage, even when this is imperceptible, leave a less volatile residue upon evaporation which renders the material absolutely unsuited for the direct application to foodstuffs in warehouses or similar uses.

The object of the present invention is to stabilize and thus enhance the value of these relatively unstable cyclic sulphides by making them substantially stable under ordinary conditions of storage and transportation so that they can be stored for relatively long periods of time and/or shipped for great distances with substantially no deterioration.

We accomplish this result through the addition of a small amount of a suitable stabilizer. We have found by tests that the property of stabilizing organic cyclic sulphides is common to compounds of the elements of the sulphur group (which group embraces sulphur, selenium and tellurium) wherein said element is in the divalent state.

While this specific property of stabilizing cyclic organic sulphides is possessed by all compounds containing divalent sulphur, selenium or tellurium, not all such compounds are equally suitable. Thus, from the available divalent sulphur, selenium and tellurium compounds, it is desirable in any given instance not to select for use those compounds having detrimental characteristics which outweigh their stabilizing effect. Thus, compounds which are in themselves very unstable, as well as compounds having a very strongly acidic or basic reaction, are in many cases unsuitable. The former are usually ineffective, and the latter often tend to affect the cyclic sulphides detrimentally through their strong acid or basic reaction.

The alkyl mercaptans, aromatic mercaptans, alkyl sulphides, aromatic sulphides, alkyl mercaptides, aromatic mercaptides, acid metal sulphides, metal sulphides, salts of alkyl thioacids, alkyl thioacids, alkyl thiocyanates, metal thiocyanates, xanthates and related subclasses of divalent sulphur compounds as well as their corresponding available selenium and tellurium compounds are applicable. For example, the following compounds, among others, have been found to stabilize the cyclic compounds to which the present invention relates: hydrogen sulphide, hydrogen selenide, ethyl mercaptan, ethyl sulphide, thiophenol, α-thionaphthol, carbon disulphide, ferric sulphide, thioacetic acid, mercuric sulphide and potassium thioacetate.

Due to their availability and much lower cost, the above-mentioned sulphur compounds are preferred over the corresponding selenium and tellurium compounds. Further, of the sulphur-containing compounds, we have found the soluble members to be more effective, in many cases, than the insoluble members; for example, $H_2S$ is a more effective stabilizer than an equivalent amount of $Fe_2S_3$.

Such compounds as dithiocarbamic acid, tri- or dithiocarbonic acid alkyl esters, seleno-urea, seleno carbanilide, etc., which under the influence of light, air, moisture, etc., cause separation of stabilizers in the above sense are also applicable.

We have found that these stabilizers or mixtures thereof are generally effective in quite small concentrations and may be used in mixtures of cyclic sulphides or in solutions containing an unstable cyclic sulphide as well as the pure compounds. While, in general, concentrations below 1% are suitable, the optimum concentration may vary considerably depending upon the material to be stabilized, the stabilizer chosen and the solubility of said stabilizer.

While the mechanism of the stabilizing action is not perfectly understood, we have found that it differs from that of the usual stabilizing mechanisms. This is shown effectively by the negative stabilizing action of the usual stabilizing agents; thus, for example, pyrocatechol, hydroquinone, meta nitro benzaldehyde, ortho nitro benzaldehyde, picric acid, ortho nitrophenol, para nitrophenol, hydrocyanic acid, carbonic acid, acetic acid, phenol and salicylic acid have been found to be ineffective in stabilizing the compounds to which the invention relates.

The following example, which is for the purpose of illustration and not limitative, shows the effectiveness and a suitable application of the present invention.

Example

In the production of ethylene sulphide, as for example, through the interreaction of ethylene oxide and potassium rhodanide in aqueous solution followed by distillation, the product is a clear liquid. Within 24 hours from the time of distillation, however, even if stored in the dark, a white cloud is developed which continually forms, and collecting to a precipitate, settles to the bottom of the container. This deterioration is not prevented through the use of tin plated containers, nor glass containers previously boiled in hydrochloric acid. By the addition of any one or a mixture of the herein described stabilizers in stabilizing amounts, as for instance, 0.025–0.5% ethyl mercaptan or ethyl sulphide, or by introducing hydrogen sulphide until 0.025 to 0.1% by weight of it has been taken up, this deterioration is obviated.

To remove any possible ambiguity concerning the terms employed in the specification and claims it is herein stated that the terminology used is one based on the Geneva nomenclature and further in the particular case of alkyl sulphides, said expression is not intended to include olefine sulphides and does not include the latter.

We claim as our invention all that is commensurate with the scope of the appended claims.

We claim as our invention:

1. A stabilized composition of matter comprising ethylene sulphide stabilized against deterioration under ordinary storage and transportation conditions by the addition thereto of a stabilizing amount of hydrogen sulphide.

2. A stabilized composition of matter comprising ethylene sulphide stabilized against deterioration under ordinary storage and transportation conditions by the addition thereto of a stabilizing amount of an alkyl mercaptan.

3. A stabilized composition of matter comprising ethylene sulphide stabilized against deterioration under ordinary storage and transportation conditions by the addition thereto of a stabilizing amount of an alkyl sulphide.

4. A stabilized composition of matter comprising an organic cyclic sulphide, which contains only carbon, hydrogen and sulphur atoms and possesses in its structure at least one

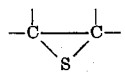

group, stabilized against deterioration under ordinary storage and transportation conditions by the presence therein of a stabilizing amount of hydrogen sulphide.

5. A stabilized composition of matter comprising an organic cyclic sulphide which contains only carbon, hydrogen and sulphur atoms and possesses in its structure at least one

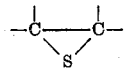

group, stabilized against deterioration under ordinary storage and transportation conditions by the addition thereto of a stabilizing amount of a material selected from the group consisting of hydrogen sulphide, carbon disulphide, the alkyl and aromatic mercaptans, the alkyl and aromatic sulphides, the alkyl and aromatic mercaptides, the metal hydrosulphides, the metal sulphides, the salts of alkyl thioacids, the alkyl thioacids, the alkyl thiocyanates, the metal thiocyanates, the xanthates and the corresponding selenium and tellurium compounds, which material is effective to stabilize the organic cyclic sulphides described.

6. A stabilized composition of matter comprising an organic cyclic sulphide containing the group

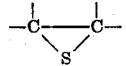

stabilized against deterioration under ordinary storage and transportation conditions by the addition thereto of a stabilizing amount of a material selected from the group consisting of hydrogen sulphide, carbon disulphide, the alkyl and aromatic mercaptans, the alkyl and aromatic sulphides, the alkyl and aromatic mercaptides, the metal hydrosulphides, the metal sulphides, the salts of alkyl thioacids, the alkyl thioacids, the alkyl thiocyanates, the metal thiocyanates, the xanthates and the corresponding selenium and tellurium compounds, which material is effective to stabilize the organic cyclic sulphides described.

WILLEM COLTOF.
SIEGFRIED LEONARD LANGEDIJK.